Sept. 17, 1963 W. F. CRENSHAW 3,103,740
COLLAPSIBLE BEARING PULLER
Filed Jan. 2, 1963 2 Sheets-Sheet 1
FIG. I
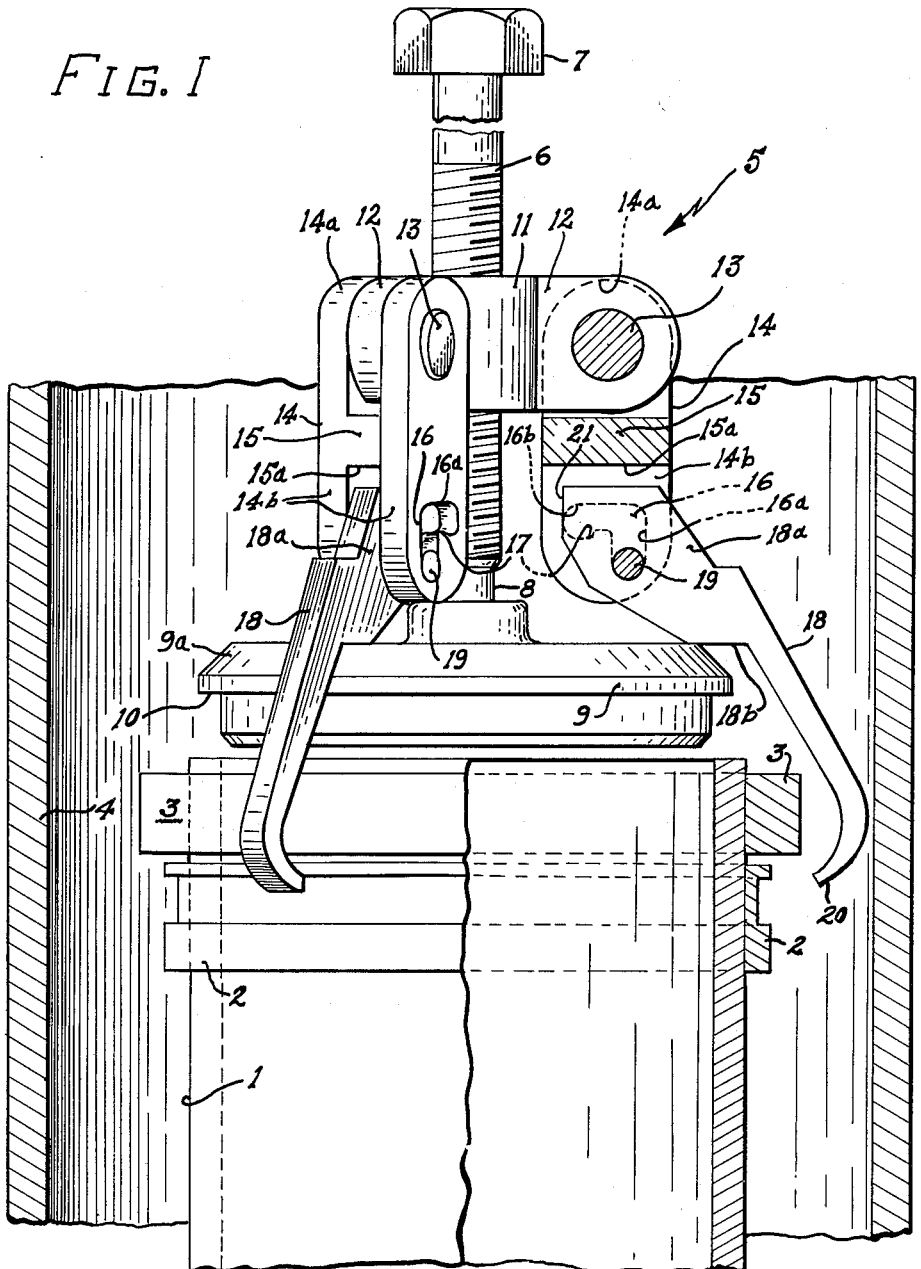
INVENTOR.
WILLIAM F. CRENSHAW
BY
ATTORNEYS

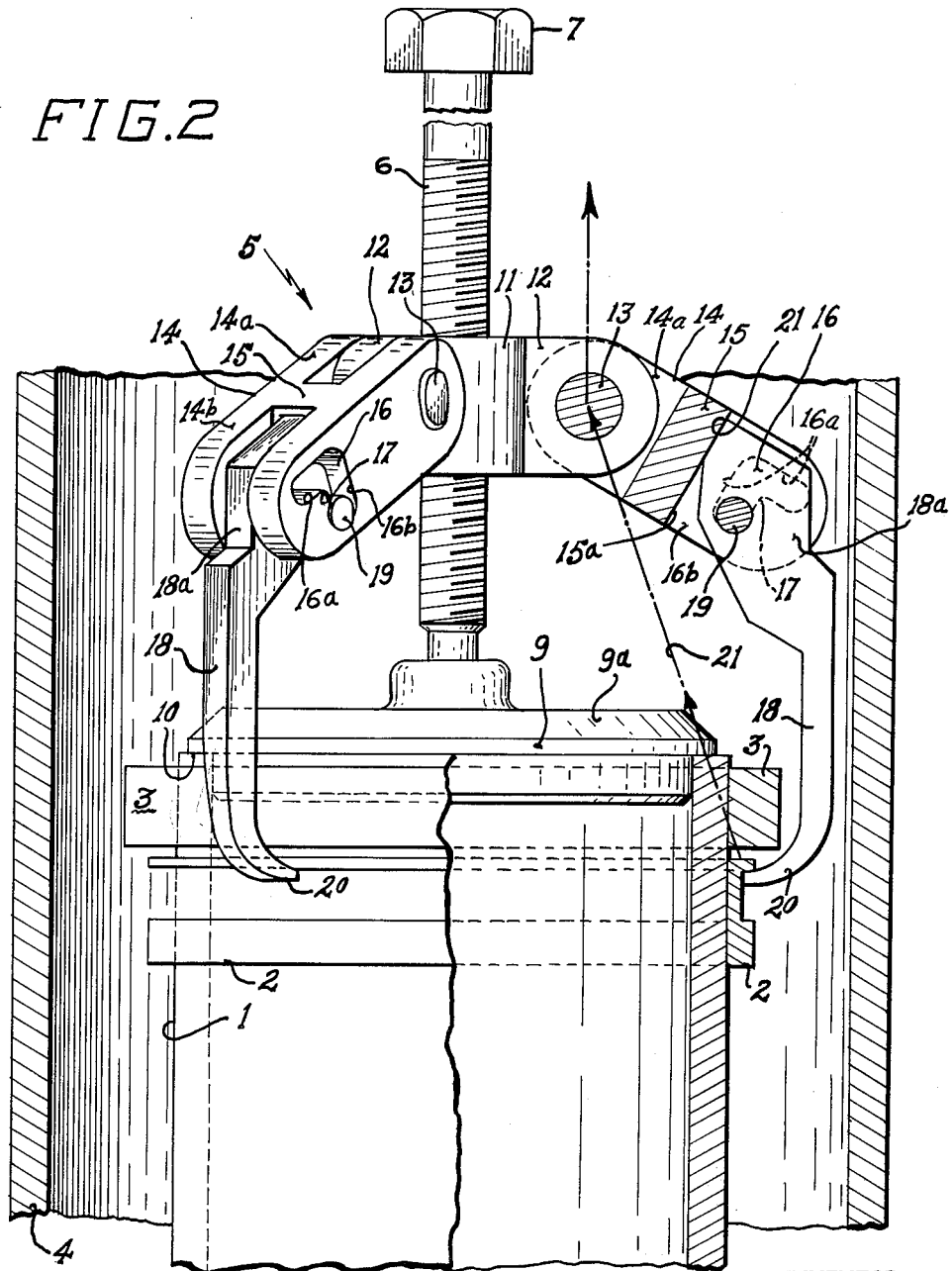

United States Patent Office 3,103,740
Patented Sept. 17, 1963

3,103,740
COLLAPSIBLE BEARING PULLER
William F. Crenshaw, Midwest City, Okla., assignor to the United States of America as represented by the Secretary of the Air Force
Filed Jan. 2, 1963, Ser. No. 249,102
3 Claims. (Cl. 29—261)
(Granted under Title 35, U.S. Code (1952), sec. 266)

The invention described herein may be manufactured and used by or for the United States Government for governmental purposes without payment to me of any royalty thereon.

This invention relates to pulling devices and, more particularly, to collapsible pulley devices of the wheel puller types and has for an object a puller device for removing or pulling annular members, such as inner bearings, races and collars, which are located in radially restrictive places, such as an inner bearing and race mounted in surrounding relation on an inner tubular member which is surrounded by an outer, closely spaced concentric tubular member which prevents conventional puller devices from being inserted between the inner bearing and race structure and the surrounding outer tubular member.

A further object of the invention is the provision of a collapsible puller device having a crosshead or spider and jack member with a plurality of link members each pivotally connected at one end to the spider or crosshead adjacent the jack member and pivoted at their opposite ends to elongated inturned hook members which are swingable on the link members toward and away from the central axis of the crosshead to change the angular relation thereof to the longitudinal axes of the link members, whereby the pivotal ends of the hook members are displaced inwardly and outwardly to change the inclination of the elongated inturned hook members relative to the axis of the crosshead, and includes the provision of locking means between the link and hook members for retaining the hook members in rigid relation on the link members upon predetermined angular displacement between the link members and hook members.

Another object includes a shiftable pivot connection between each link and its connected hook member and the provision of means for locking each of the hook members to its connected link member against angular displacement when the shiftable pivot connection is moved to one of its shiftable positions.

Still a further object is the provision of a puller device having a jack screw member with a swivelled pilot head abutment and including a crosshead movable axially on the jack screw member by rotation thereof having a plurality of link members pivoted at one end to the crosshead adjacent the jack screw member for radial swinging movement toward and away from the jack screw member and the provision of elongated inturned hook members slidably pivoted at one end to the free ends of the link members for swinging and axially sliding movement thereon, including engageable abutment means between the hook and link members to prevent inward swinging movement of the hook members relative to the link members when the link members are swung outwardly relative to the hook members and the hook members are slid to one of their slidably adjusted positions.

Another object of the invention is the provision of a puller device having a jack screw and an abutment pilot head thereon including elongated puller arms linked to the jack screw at one end and formed with inwardly curved puller abutments at their free ends, whereby the pivot ends of the puller arms are radially movable inwardly toward the jack screw relative to the inwardly curved puller abutments in order to provide greater clearance of the incurved puller abutments for passage thereof between an inner cylindrical member having an annular outer removable abutment thereon and a surrounding closely spaced tubular member, and the provision of means for locking the puller arms to the link members against relative inward swinging movement on the link members, when the link members are swung outwardly to a predetermined position to displace the pivotal ends of the puller arms outwardly after the inwardly curved puller ends are passed between the annular removable abutments on the cylindrical member and the closely spaced surrounding outer tubular member to move the inwardly curved puller ends inwardly to provide pulling engagement of the extremities of the inwardly curved puller ends with the removable abutments for withdrawal thereof from the inner cylindrical member.

Other objects and advantages of the invention will become apparent from the following description and the accompanying drawings in which like reference characters refer to like parts in the several figures.

FIG. 1 is a side elevation of the improved puller device showing the same in collapsed position for passage of the inturned puller extremities of the puller arms past an annular removable abutment such as a collar or inner race of a bearing which is closely surrounded by an outer concentric tubular or sleeve member.

FIG. 2 is a similar view, showing the puller device in its operative or pulling position with the elongated puller arms locked to the link members against relative angular movement thereon and showing the pulling engagement of the inwardly curved pulling extremities with an annular member, such as a removable inner race of a bearing, or a collar, prior to the withdrawal thereof from the inner tubular or cylindrical support member.

Reference being made to the drawings, the reference numeral 1 denotes an inner tubular or cylindrical support member or sleeve on which are removably mounted annular members 2 and 3. The members 2 and 3 may comprise the annular inner race members of a bearing and collar surrounded in closely spaced concentric relation by an outer tubular member or sleeve 4 which is so closely spaced relative to the members 1, 2 and 3 as to prohibit the insertion and passage of the inturned pulling ends or abutments of a conventional puller device therebetween.

My improved puller device is indicated generally at 5 and comprises a central jack screw member 6 having a hex. head 7 thereon for rotation thereof. The jack screw 6 carries a concentric abutment disk or pilot head 9 swivelled thereon, formed with an annular shoulder 10 for abutting engagement with the outer end of a tubular or sleeve-like supporting member such as indicated at 1, from which the annular surrounding members such as 2 and 3 are to be withdrawn.

Threaded on the screw jack member 6 is a crosshead member 11 having a plurality of rigid radial arms or ears 12 projecting in radial directions, a link member 14 being pivoted at 13 on each of the arms or ears 12.

The link members 14 are swingable in radial directions about the pivots 13 from a collapsed position, as shown in FIG. 1, to an outwardly inclined operative position, indicated in FIG. 2. The opposite end portions 14a and 14b of the link members 14 are bifurcated and provide a locking abutment or web 15 intermediate the bifurcated ends 14a and 14b.

The free or bifurcated ends 14b of the links 14 are provided with angular or dog leg slots 16, each having one leg portion 16a extending longitudinally away from the end 14a parallel to the longitudinal axis of the link member and a second connecting leg portion 16b which is substantially perpendicular to the dog leg portion 16a and is provided with a locking abutment shoulder or dwell 17 adjacent the outer end of the leg portion 16b of the slot 16.

Pivotally and slidably mounted on each of the link members 14, between the bifurcated end portions 14b, is an elongated puller arm 18 having a pivot pin or shaft 19 fixed therein which is slidably and rotatably mounted in the slots 16 between the opposite ends thereof.

The puller arms 18 are each formed at their free end outer ends with an inwardly curved puller abutment or hook end portion 20 for pulling engagement with annular members such as 2 and/or 3 after the inturned ends are moved past the members 2 and 3 and the link members 14 are swung outwardly from the collapsed position of the device as seen in FIG. 1 to its operative or pulley position shown in FIG. 2.

The pivot end of the puller arms 18, indicated at 18a, have an angular perimeter which includes a locking shoulder or abutment face 21 which is disposed for contacting engagement with the face 15a of the web 15 of the link 14 after the link members 14 are swung outwardly from the positions shown in FIG. 1 to the positions shown in FIG. 2 to displace the inturned abutment ends 20 inwardly for engagement with the bearing races and collars 2 and 3, and are shifted on the link members to move the pivot pins 19 in the slots 16 from the ends of the portions 16a to the ends of the slot portions 16b and behind the abutments or dwells 17, thus locking the links 14 and arms 18 together in the angular relation shown in FIG. 2 of the drawing for establishing a direct line of pull between the pivots 13 of the crosshead and the pulling abutment extremities 20 as indicated by the line 21, when jack screw 6 is rotated to bring the pilot head 11 into impinging contact with the outer end of the bearing or collar supporting member 1. Further rotation of the jack screw 6 advances the crosshead 11 on the jack screw in the direction of the manipulating nut 7 to pull or withdraw the annular members 2 and 3 off the supporting member 1.

It should be noted that the periphery of the rear of the pilot head 9 is beveled at 9a for abutment with the angular surfaces 18b on the head of the puller arms when the arms are inclined in the collapsed positions.

In operating the puller device, the link members 15 are swung to positions substantially parallel to the axis of the jack screw member 6 and the puller arms 18 are moved to dispose the pivot pins 19 thereon at the outer ends of the dog leg slot portions 16a. The crosshead 11 may be adjusted on the jack screw 6 to bring the surface 18b in contact with the bevel edge 9a on the top surface of the pilot head 9 to assist in displacing or holding th eouter hook ends of the arms 18 outwardly against or adjacent the inner surface of the surrounding sleeve 4 when the inturned hook ends 20 are inserted and moved past the annular inner bearing races or collars 2 and 3 as the pilot head 9 is moved into engagement with the outer end of the tubular member or support 1. Outward movement of the arms 18, with the links and pivots 19 displaced inwardly adjacent the jack-screw member, causes the extremities of the inturned ends to be displaced radially outwardly and closer to the inner surface of the surrounding member 1 so as to pass between the latter member and the annular inner bearing race and/or collars 2 and 3.

After the extremities of the inturned hook ends 20 are moved past the members 2 and 3 and into engaging relation relative to the members 2 and 3, the link members 14 are swung outwardly to displace the heads 18a and lever pivots 19 outwardly, and the pivot pins 19 are moved from the outer ends of the leg portions 16a of the slots 16 to the opposite ends of the slot portions 16b, behind or past the abutments or dwells 17. This swinging and sliding movement of the arms 18 on the links 14 brings the abutments 21 on the heads of the arms 18 into locking abutment with the webs 15 when the links are swung outwardly to carry the pulling extremities 20 of the arms into pulling engagement with the annular inner races or members such as 2 and 3.

The above locks the arms 18 to the links 15 in the angular relation shown in FIG. 2 with the legs or elongated portions of the arms 18 substantially parallel to the axis of the jack screw 6 and the locked units, consisting of the links 14 and arms 18, now pivot from the pivot points 13, thus directing the line of pull inwardly toward the axis of the jack screw member when the latter is rotated to move the crosshead 11 toward the nut portion 7 with the pilot head 9 in impinging engagement with the outer end of the tubular inner race bearing supporting member 1.

I claim:
1. A collapsible puller device of the class described comprising, a jack screw having a pilot head abutment thereon, a crosshead movable axially on said stem, a plurality of link members pivoted to said crosshead in circumferentially spaced relation around and adjacent to said stem for outward swinging movement radially to said stem from collapsed positions substantially parallel to said stem and toward said pilot head abutment to outwardly inclined operative positions, an elongated puller arm having an inturned puller end and abutment at one end and pivotally and slidably connected at its other end to the free end of each of said link members for inward and outward swinging movement in the plane of swinging movement of said link members and bodily shiftable on said link members toward and away from the pivotal axes of said link members on said crosshead, said pivotal and slidable connection between said link members and said puller arms comprising pin and slot connecting means therebetween, and abutment means between said link members and puller arms shiftable by movement of said puller arms into abutting engagement when said puller arms are shifted on said link members to a predetermined operative position thereon to lock said arms to said link members against outward swinging movement relative to said link members, and shiftable on said link members to an inoperative position to disengage said abutment means for free swinging movement of said puller arms on said link members.

2. A collapsible puller device of the class described comprising, a jack screw stem having a pilot abutment head swivelled thereto at one end, and means at its opposite end for rotating said stem, a crosshead member threaded on said stem for axial movement thereon incident to rotation thereof, a plurality of bifurcated link members each pivoted at one end to said crosshead member in circumferentially spaced relation around and adjacent to said stem for radial swinging movements between collapsed positions adjacent to and substantially parallel to said stem and outwardly inclined operative positions inclining outwardly in a direction toward said pilot abutment head and said link members each having an integral abutment thereon intermediate its ends, and formed with an angular dog leg slot therein between said abutment and the free end thereof having one leg portion of said slot extending from the free end of said link member substantially parallel to the longitudinal axis of said link member toward said abutment and then extending substantially at right angles across said link member and terminating in a locking abutment or dwell, an elongated puller arm slidably and swingably disposed at one end in the bifurcated end of each link member between the free end thereof and said abutment including a pivot pin projecting from said one end of said puller arm into said slot for movement by said puller arm between the opposite ends of said angular slot, and a locking abutment formed on the said one end of said puller arm for abutting engagement with said abutment on said link member when said puller arm is slid to dispose said pivot pin in the end of said right-angular portion of said slot in engagement with said locking abutment in said slot to prevent relative inward swinging movement of said puller arms toward said stem, relative to the axis of said link members, when said link members are inclined outwardly in their said operative positions.

3. In a puller device, a central stem, a crosshead axially movable on said stem, a plurality of link members pivoted at one end to said crosshead adjacent said stem for radial swinging movements from collapsed positions adjacent said stem to operative puller positions inclined outwardly away from said stem, each link member having an elongated dog leg angular slot formed therein having a slot portion extending from adjacent the free end of said link member in a direction toward the pivot end of said link member and a connected slot portion extending across said link member substantially normal to the first slot portion, terminating in a locking dwell and abutment at the end of said slot, an elongated puller arm slidably and pivotally mounted on the free end of each link member having a pivot pin member rigidly projecting therefrom into said slot for pivotal and slidable movements therein between the opposite ends of said angular slot, cooperating abutment means on said puller arms and said link members for preventing angular swinging movement of said puller arm relative to said link members in a direction away from said stem when said link members are moved outwardly to their said operative positions relative to the free ends of said puller arms to dispose said puller arms and link members in angular operative relation to each other and said puller arms are slid on said link members to dispose said pivot pin members in said dwells in engagement with said abutments in said slots, said puller arms having incurred puller abutment ends extending inwardly toward the axis of said stem.

References Cited in the file of this patent
UNITED STATES PATENTS

| | | |
|---|---|---|
| 1,709,913 | Kaplan | Apr. 23, 1929 |
| 2,360,781 | McGinnis et al. | Oct. 17, 1944 |

FOREIGN PATENTS

| | | |
|---|---|---|
| 1,018,632 | France | Jan. 9, 1953 |
| 1,046,590 | France | Dec. 8, 1953 |